United States Patent Office 3,037,028
Patented May 29, 1962

3,037,028
SYNTHESIS OF IMIDAZOLES
Harold A. Green, Elkins Park, Pa., assignor to Air Products and Chemicals, Inc., a corporation of Delaware
No Drawing. Filed July 6, 1959, Ser. No. 824,932
10 Claims. (Cl. 260—309)

The present invention relates particularly to synthesis of imidazole and 2-alkyl imidazole compounds from alkylene diamines having the amino groups on vicinal carbon atoms. The described reaction is also applicable to the preparation of 1,3-diazines from alkylene diamines having the amino groups on alternate carbon atoms.

Imidazoles as a class are characterized by their essentially aromatic character, high boiling points, and good stability to oxidizing and reducing agents. They undergo typical aromatic reactions such as nitration, chlorination and diazo coupling. The 2-alkyl and 2-alkenyl imidazoles show a strong detergent and emulsifier action in petroleum oils and have a protective action on metals contacted with such oils. The long chain 2-alkyl (>6C) imidazoles are used as surface active agents and the corresponding quaternary compounds show the typical germicidal properties of cationic surfactants. Various imidazole derivatives have been suggested for use as anti-oxidants, as co-polymers in nitrogenous synthetic fibers to confer dye-fastness, and as intermediates for a wide variety of pharmaceuticals, particularly those having anti-histamine and atropine-like activity. The imidazoles are sufficiently basic to form salts with organic acids of intermediate strength, yet are pseudo-acidic in character and capable of forming many metallic salts.

The classical synthesis of imidazoles involves condensation of glyoxal with ammonia with or without added aldehydes. The formation of 2-alkyl and 2-alkenyl imidazolines by condensation of acylated ethylene diamine in the presence of dehydrating agents is described in U.S. Patents Nos. 2,399,601 and 2,404,299. The obtained 2-alkyl imidazolines are converted to the corresponding imidazole compounds by dehydrogenation over a nickel catalyst.

More recently there was disclosed in U.S. Patent No. 2,847,417 a process for direct preparation of imidazoles and 2-hydrocarbon substituted imidazoles by reaction of an alkylene polyamine with a carboxylic acid, ester or anhydride, over solid dehydrocyclization catalyst, preferably over supported platinum catalyst.

In accordance with the present invention imidazole compounds of the formula

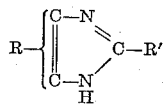

R and R'=H or substituents are prepared by the reaction of an alkylene diamine having vicinal amino groups with a primary alcohol or its corresponding oxidation product in the form of an aldehyde; by effecting such reaction in vapor phase over a solid dehydrogenation catalyst capable of sorbing water released in the reaction.

The reaction is illustrated in the case of propylene diamine-1,2 as follows:

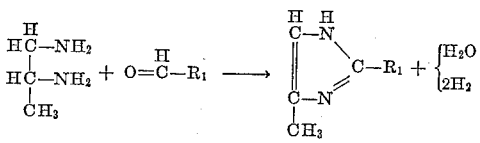

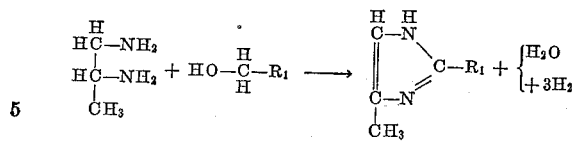

In similar manner, if the amino groups are attached on alternate carbon atoms of the alkylene diamine, as, for example, in propylene diamine-1,3, six-membered heterocyclic compounds (pyrimidines) are formed.

Thus, as starting alkylene diamines there may be employed:

$H_2N$—$CH_2$—$CH_2$—$NH_2$, ethylene diamine
$H_2N$—$CH_2$—$CH_2$—$CH_2$—$NH_2$, propylene diamine-1,3
$CH_3$—$CH(NH_2)$—$CH_2$—$NH_2$, propylene diamine-1,2
$CH_3$—$CH(NH_2)$—$CH(NH_2)$—$CH_3$,
butylene diamine-2,3
$H_2N$—$CH_2$—$CH(NH_2)$—$CH_2$—$CH_3$,
butylene diamine-1,2

The $R_1$ of the aldehyde or alcohol is hydrogen or an alkyl radical of from 1 to 6 carbon atoms, a cycloalkyl radical of from 5 to 7 carbon atoms (cyclopentyl, methylcyclohexyl), or an aryl radical of 6 to 7 carbon atoms (e.g., phenyl, benzyl or tolyl).

The reaction is carried out over an active multifunctional catalyst to effect simultaneous dehydration and dehydrogenation with accompanying condensation and ring closure. The catalyst therefore comprises an active dehydrogenation component associated with a carrier of sufficiently high surface area to absorb the water released in the dehydration. The preferred catalyst is platinum supported on alumina, which is substantially free of acidic components, such as halide ions. Such catalysts can be prepared by impregnation of the alumina with a solution of platinum nitrate or with solutions of other halide-free platinum salts or complexes, as for example commercial "P-salt" $[(NO_2)_2 \cdot Pt \cdot (NH_2)_2]$. When the impregnating solution employed is the more usual chloroplatinic acid type or other soluble platinum halide salt or complex, and the alumina impregnated therewith is thereafter subjected to the conventional reduction with hydrogen, the halide is nevertheless retained in the catalyst in chemical association with the alumina or otherwise. Platinum-on-alumina catalysts containing such halide have pronounced activity for promoting acid-catalyzed reactions including isomerization, olefin polymerization and cracking, in addition to the hydrogenation-dehydrogenation function of the platinum. To remove the halide from the platinum-alumina catalyst, accordingly, the catalyst is treated with reducing gas (e.g., hydrogen) and steam, until the halide content is reduced to below 0.1 weight percent of halide on the catalyst.

A convenient method for preparing platinum-alumina catalyst of low halide content involves subjecting the halide-containing platinum-alumina catalyst to a reducing atmosphere containing 25 to 75 mol percent steam and 10 to 75 mol percent of a reducing gas, such as hydrogen, and if desired or required, the balance of inert gas, such as nitrogen. The treatment with such gaseous mixture is effected at temperatures in the range of 700 to 1000° F. for 1 to 36 hours. A superior catalyst employed in the process of the invention is one thus prepared comprising, prior to steam treatment, about 0.5% platinum, 0.5% chloride and 99% gamma alumina.

Catalysts containing other nobel metals of the platinum family, such as palladium, can be similarly prepared on alumina employing halide-free impregnating solutions of such noble metal compounds or by subsequent steaming to remove halide, when introduced by halide-containing impregnating solutions.

Noble metal catalysts can be employed supported on carriers other than those composed of or comprising alumina. In such instance no difficulty is encountered with respect to the halide from the impregnating metal solution since the same is substantially removed during conventional reduction. Suitable carriers of this type for platinum or other noble metal of the platinum family, already named above, include activated carbon, magnesia and silica. There also come into consideration supported platinum and other noble metal catalysts on silica-alumina dried gel carriers. Removal of halide, when chloroplatinic acid or other halide-containing impregnating solution is employed in their preparation, can be effected by steaming in a reducing atmosphere in the same manner as above described for the gamma alumina supported catalysts. Since silica-alumina of itself contributes a high acid function, such carrier should be subjected to an attenuating treatment as by heat treatment in a steam atmosphere or by other methods already known to the art. While such catalysts on supports other than activated alumina (gamma alumina) are operative to greater or less degree in the imidazole synthesis reactions according to the invention, these are not to be considered equal in all respects in yield and selectivity to the preferred platinum-alumina catalysts of the described halide-free or low halide content.

Also there can be employed as catalyst, but not necessarily with equal advantage, supported cobalt-molybdate catalyst in which the cobalt-molybdate is in the form of a true molecular compound ($CoMoO_4$) as distinguished from a mixture of the oxides of cobalt and molybdenum. Such catalyst can be prepared in a number of ways. In a preferred method, an aqueous solution of a soluble cobalt salt, such as cobalt nitrate, and an ammoniacal solution of a soluble molybdate, such as ammonium molybdate are mixed in substantially stoichiometric amounts in the presence of a stabilized alumina base to produce hydrated cobalt-molybdate impregnated on alumina. Drying the impregnated base and calcining at a temperature in excess of 445° C. remove the water of hydration from the cobalt-molybdate.

The concentration of cobalt-molybdate is not critical and its weight percentage with respect to alumina or other porous support may be varied over a considerably wide range. A typical catalyst of this class comprises 10 percent by weight of cobalt-molybdate on alumina of high porosity, such as an alumina having a surface area in the order of 230 square meters per gram. Prior to use the catalyst is preferably reduced in a stream of hydrogen.

Although the described synthesis of the diaza-heterocyclic compounds involves a dehydrogenation process with the release of gaseous hydrogen, it is eminently desirable (though not critical) to effect the reaction in the presence of added hydrogen, which has been found to contribute materially to the useful life of the catalyst, to diminish coke formation on the catalyst and to improve the selectivity of the process for production of the desired heterocyclic diaza-compounds.

In operation of the process the alkylene polyamine and alcohol or aldehyde reactants are preferably premixed in about equimolar proportions, the mixture vaporized and preheated to about reaction temperature and passed over the preheated catalyst. For example, the reaction vessel may contain a layer of inert heat capacity material such as quartz above the bed of catalyst. The catalyst and the inert layer are brought to the desired reaction temperature of 600–900° F. by passing preheated hydrogen or an inert gas followed by hydrogen through the reaction vessel, or by other means (heat exchange liquids or resistance heating). The mixture of reactants by being passed over the hot inert layer, preferably with several mols of added hydrogen gas, is thus vaporized and brought to about reaction temperature prior to contact with the catalyst.

EXAMPLE I

An equimolar ethylene diamine-formaldehyde mixture was prepared by adding a 36–38% formalin solution to ethylene diamine solution (98%) with cooling. The temperature was at 40–50° C. during the addition. This mixture was passed over a preheated section containing ⅔ volume of quartz at 700° F. and then over 1 volume of platinum alumina catalyst at the same temperature together with the 2 volumes per minute of hydrogen per volume of catalyst, the reactants being charged at the rate of 1.2 volumes (determined as liquid) per hour per volume of catalyst.

The liquid reaction product was fractionally distilled and crude imidazole recovered from 4 fractions over the boiling range of 240–267° C. at atmospheric pressure. On recrystallization of the product from a benzene-hexane solution containing a small amount of ethanol, there was obtained a white solid having a melting point of 88–89° C. Conversion based on the quantity of ethylene diamine charged was 28.5% for a once-through operation.

The catalyst employed in the above example was prepared by treating activated alumina in the form of 4 mm. cylindrical pellets with 10% acetic acid at room temperature for an hour followed by rinsing in distilled water and thereafter impregnating the pellets with a solution of chloroplatinic acid in an amount to effect a deposit of 0.5% platinum therein. The impregnated pellets were then subjected to an air stream and dried at about 275° F. The dried pellets were then treated with a hydrogen gas stream at about 900° F. for an hour to convert the chloroplatinate to metallic platinum following which the catalyst was dehalided by treatment with a mixture of 10% hydrogen and 90% steam, at 900° F., and again subjected to 100% hydrogen treatment at the same temperature for another hour. The finished catalyst contained 0.1% chloride by weight, 99.4% gamma alumina and 0.5% platinum.

EXAMPLE II

Utilizing the same catalyst as in Example I above, 2-ethyl imidazole was similarly prepared from an equimolar mixture of propionaldehyde and ethylene diamine. In this run, no preheater section was employed and the mixture was passed over the steamed platinum-alumina catalyst at 700° F. and at a space rate of 0.72 volume (as liquid) per hour per volume of catalyst together with hydrogen at the rate of 1.2 volumes per minute per volume of catalyst. The effluent was fractionally distilled with the recovery of the 2-ethyl imidazole fraction over the boiling range of 271–275° C. The crude product having a melting point of 62–65° C., was obtained in 56.4% yield based on the ethylene diamine charged. Recrystallization of a portion from a benzene-hexane solution gave a white solid having a melting point of 76–77° C.

EXAMPLE III

A charge stock containing 415 parts by weight of ethylene diamine and 230 parts by weight of ethanol was passed over a preheater section containing ⅔ volume of quartz and then over 1 volume of steamed platinum-alumina catalyst at 700° F. and at a liquid hourly spaced velocity of 1 together with added hydrogen supplied at the rate of 2 volumes per minute per volume of catalyst.

The reactor effluent was distilled to 200° C. at atmospheric pressure, leaving a brown crystalline semi-solid residue. By recrystallization from benzene-hexane solution there was obtained 2-methyl imidazole as a white solid having a melting point of 142–143° C. The mixed melting point with an authentic sample of 2-methyl imidazole was 143–144° C. Conversion based on ethylene diamine charged was 27% for the once-through operation.

In similar manner other 2-substituted imidazoles can be prepared by the reaction of vicinal alkylene diamines with the appropriate alcohol (carbinol) or aldehyde (carboxaldehyde) as shown in the table below:

Table 1

| Imidazole Derivative | Amine | Aldehyde or Alcohol | |
|---|---|---|---|
| 2 n-propyl | ethylene diamine | n-butyraldehyde | n-butanol |
| 2 n-butyl | do | n-valeral | n-pentanol |
| 2 n-amyl | do | n-hexanal | n-hexanol |
| 2-phenyl | do | benzaldehyde | benzyl alcohol |
| 2-benzyl | do | beta-phenyl-acetaldehyde | phenethyl alcohol |
| 2,5-dimethyl | Propylene diamine-1,2 | acetaldehyde | ethanol |

Obviously many modifications and variations of the present invention as hereinbefore set forth may be made without departing from the spirit and scope thereof and therefore only such limitations should be imposed as are indicated in the appended claims.

What is claimed is:

1. The method of preparing diaza-heterocyclic compounds which comprises reacting in vapor phase alkylene diamine with an oxy-carbon compound containing a reactive CH group, at a temperature in the range of 600–900° F. and in the presence of a dual-function catalyst having dehydration and dehydrogenation activity, said alkylene diamine being one having 2 to 4 carbon atoms in the alkylene chain thereof, with the amino groups spaced no further apart than on alternate carbon atoms of said chain, and said oxy-carbon compound being selected from the group consisting of aldehydes and alcohols of the formulae

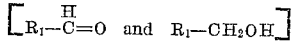

respectively, wherein $R_1$ is selected from the group consisting of hydrogen, alkyl of 1–6 carbon atoms, cycloalkyl of 5–7 carbon atoms, and aryl hydrocarbons of 6–7 carbon atoms, said catalyst consisting essentially of a carrier of high-surface area having incorporated therein an active component from the group consisting of group VIII noble metals and cobalt molybdate.

2. The method according to claim 1 wherein said catalyst is platinum supported on an alumina carrier and substantially free of halide ions.

3. The method of preparing imidazole compounds which comprises reacting in vapor phase alkylene diamine, having vicinal amino groups, with an alkyl carboxaldehyde having 1 to 6 carbon atoms, at a temperature in the range of 600–900° F. and in the presence of a supported solid group VIII noble metal catalyst having dehydration and dehydrogenation activity.

4. The method of preparing 2-alkyl imidazoles which comprises reacting ethylene diamine and a lower alkyl carboxaldehyde at temperatures in the range of 600–900° F. over platinum-alumina catalyst substantially free of halide.

5. The method according to claim 4 wherein said catalyst is one prepared by impregnating alumina with chloroplatinic acid and thereafter dehaliding with steam and hydrogen.

6. The method of preparing imidazole which comprises passing in vapor phase a mixture of formaldehyde and ethylene diamine at 600–900° F. over catalyst composed of platinum on a solid sorptive carrier of high surface area.

7. The method of preparing 2-methyl imidazole which comprises passing in vapor phase a mixture of acetaldehyde and ethylene diamine at 600–900° F. over catalyst composed of platinum on alumina free from halide.

8. The method of preparing 2-methyl imidazole which comprises reacting ethylene diamine and ethyl alcohol at 600–900° F. and in the presence of catalyst composed of platinum on a solid sorptive carrier of high surface area.

9. The method of preparing 2-ethyl imidazole which comprises reacting ethylene diamine and propionaldehyde at 600–900° F. and in the presence of catalyst composed of platinum on a solid sorptive carrier of high surface area.

10. The method of preparing 2-ethyl imidazole which comprises reacting ethylene diamine and n-propanol at 600–900° F. and in the presence of catalyst composed of platinum on a solid sorptive carrier of high surface area.

References Cited in the file of this patent

UNITED STATES PATENTS

| 2,226,057 | Graenacher et al. | Dec. 24, 1940 |
| 2,847,417 | Erner | Aug. 12, 1958 |
| 2,891,965 | Voltz et al. | June 23, 1959 |

OTHER REFERENCES

Elderfield: Heterocyclic Compounds, vol. 5, pages 245, 281 (1957).